Dec. 24, 1968     R. L. GRAHAM     3,417,609
ULTRASONIC INSPECTION TRANSDUCER
Filed July 26, 1965
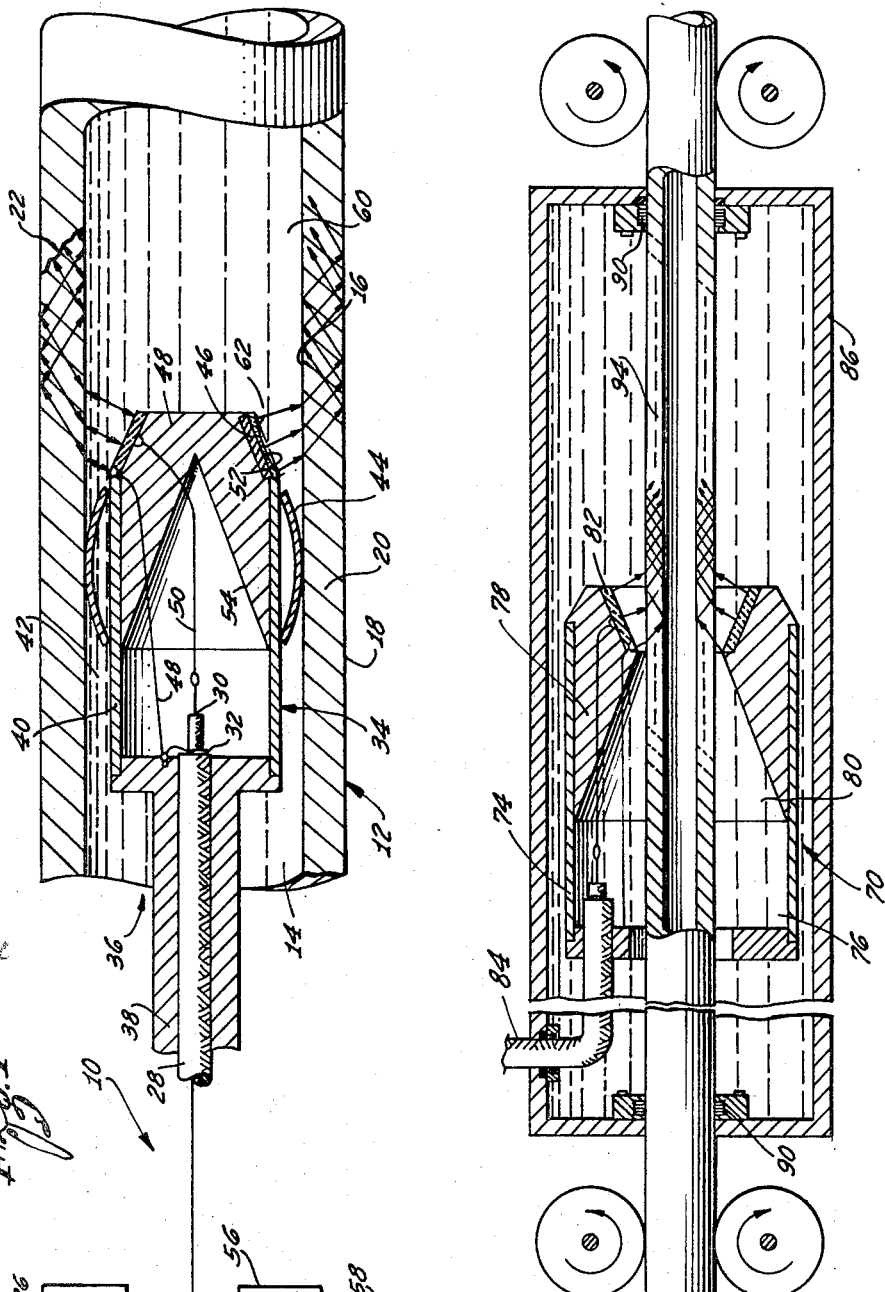
INVENTOR:
Robert L. Graham
R Sadler
Attorney United States Patent Office 3,417,609
Patented Dec. 24, 1968

3,417,609
ULTRASONIC INSPECTION TRANSDUCER
Robert L. Graham, Boulder, Colo., assignor to Automation Industries, Inc., El Segundo, Calif., a corporation of California
Filed July 26, 1965, Ser. No. 474,560
2 Claims. (Cl. 73—71.5)

ABSTRACT OF THE DISCLOSURE

The present invention relates to nondestructive testers particularly adapted for inspecting elongated objects, such as pipes, tubes, rods, etc. A search unit is provided which has a conical transducer for transmitting and receiving ultrasonic energy in a conical pattern focused around the entire cylindrical surface of the workpiece. The search unit includes dampening means for absorbing any ultrasonic energy radiated from the back side of the transducer.

---

One form of nondestructive tester that is widely used commercially is the so-called ultrasonic variety. In such a tester, an electrical signal is applied to an electroacoustical transducer which, in turn, produces and radiates ultrasonic energy. The radiated ultrasonic energy is coupled into the workpiece and transmitted therethrough. If there are any acoustical discontinuities within the workpiece, the ultrasonic energy is reflected from and/or absorbed by the discontinuity. The transmitting transducer or a second transducer is coupled to the workpiece and receives the ultrasonic energy and produces an electrical signal. This signal has characteristics which correspond to the variations in the ultrasonic energy resulting from the absorption or reflection of the energy from the acoustical discontinuity. Circuitry coupled to transducer responds to the variations in the signal and indicates the presence and location of any defects, etc.

Although ultrasonic nondestructive testers are highly developed and very effective, under some circumstances, difficulties are experienced in generating the ultrasonic energy and coupling the ultrasonic energy into and out of a workpiece. This is particularly true with certain forms of workpieces such as a cylindrical member like a pipe or tubing. Heretofore when the entire volume of pipe or tubing was inspected it was customary to rotate the transducer and/or the pipe or tubing relative to each other whereby the entire volume was scanned in a spiral pattern. This has been a very slow and costly process. Moreover it has frequently been difficult to couple the energy into the workpiece in a direction and mode for obtaining an optimum inspection of the workpiece. Also, heretofore when the outside surface of the pipe or tubing has not been readily accessible it has been extremely difficult, if not impossible, to inspect the workpiece by means of ultrasonic energy.

The present invention provides means for overcoming the foregoing difficulties. More particularly, an ultrasonic tester is provided that is particularly adapted to inspect cylindrical workpieces such as pipes, tubings, etc. The tester is not only more efficient, faster and less expensive, but is also capable of inspecting workpieces from either the inside or the outside.

In the limited number of embodiments that are disclosed herein, this is accomplished by providing a tester having a transducer with an annular, active surface such as a cone for radiating and receiving ultrasonic energy. The transducer is mounted on a probe which is adapted to fit around the outside of the workpiece or is adapted to travel through the passage in the center of the workpiece whereby the ultrasonic energy may be transmitted into the workpiece and propagate therethrough in a shear mode.

These and other features and advantages of the present invention will become readily apparent from the following detailed description of one operative embodiment thereof, particularly when taken in connection with the accompanying drawings wherein like numerals refer to like parts and wherein:

FIGURE 1 is a view of an ultrasonic tester embodying one form of the invention and employing a probe particularly adapted for inspecting a pipe from the inside, and FIGURE 2 is a longitudinal cross-sectional view of an ultrasonic probe similar to that in FIGURE 1 but particularly adapted fort testing a pipe or tube from the outside.

Referring to the drawings in more detail and particularly to FIGURE 1 thereof, the present invention is particularly adapted to be embodied in an ultrasonic tester 10 for ultrasonically inspecting workpieces for defects. Although the tester 10 may be employed to test a wide variety of different types of workpieces, in the present instance it is particularly adapted for inspecting hollow workpieces such as pipes and tubes 12 from the inside thereof.

Pipes and tubes usually have a passage 14 of generally uniform inside diameter extending axially therethrough. This passage 14 forms a cylindrical inner surface 16 which is reasonably smooth and uniform. The pipe or tube 12 also has a substantially cylindrical exterior surface 18 whereby the wall 20 of the pipe or tube 12 is of substantially uniform thickness. The wall 20 of the pipe or tube 12 is normally substantially homogeneous, and free from any discontinuities such as cracks, inclusions, etc. However, in even the highest quality pipes or tubes 12 it is possible for hidden defects 22 to be buried within the wall 20. This may be in the form of an internal crack or void or inclusion of a foreign particle. Moreover even though the pipe or tube 12 was manufactured without any defects, it is possible for defects to develop during service as a result of stress, corrosion etc. It is the purpose of the present tester 10 to facilitate the finding and locating of such defects 22.

The tester 10 includes a clock or pulser 24 for timing the operation of the tester 10. This pulser 24 is effective to intermittently produce reference or clock pulses. The pulser 24 controls the repetition rate for the tester 10. Although the repetition rate may be within a wide range, depending upon the nature of the test, it is normally in a range of about 1 or 2 kilocycles per second.

A pulse generator 26 is interconnected with the pulser 24 and is effective to produce a test pulse in response to each clock pulse. The pulses from the generator 26 are in the form of an electrical signal having a predetermined frequency which is normally in the ultrasonic range. By way of example, the frequency may be in a range extending from a few kilocycles on up to about 25 megacycles or even higher. The output of the generator 26 is coupled to one end of a transmission line 28 capable of carrying the pulses. Normally the transmission line 28 is in the form of a flexible coaxial cable having an inner conductor 30 and a concentric outer conductor 32.

The opposite end of the cable 28 is coupled to an ultrasonic search unit 34. The search unit 34 is particularly adapted to fit into the interior of a workpiece such as the pipe or tube 12 that is to be tested. The search unit 34 forms an integral part of a probe 36 mounted on the end of a push rod 38 or similar device. This will facilitate moving the probe 36 axially through the workpiece 12 as it is being inspected.

The transducer 46 includes a hollow cylindrical housing 40 which may be attached directly to the end of the push rod 38. The outside diameter of the housing 40 is prefer-

3 ably considerably less than the inside diameter of the pipe or tubing 12. The resulting clearance 42 should be sufficiently large to permit the housing 40 to move freely through the pipe or tube 12. Suitable guide means such as a plurality of resilient springs 44 may be provided around the exterior of the housing 40. The springs 44 are bowed whereby they will slide along the inner surface 16 of the pipe or tubing 12. The springs 44 should be effective to ride around and over any obstruction such as bends, cor-

4

In order to improve the coupling between the active surface 52 and the inner surface 16, the pipe or tube 12 may be filled with an acoustically conductive liquid 60 such as water. In addition, the active surface 52 may have a lens member 62 coupled thereto. This member 62 has a torrodial surface that focuses the energy into a relatively narrow beam. This will be effective to concentrate the energy into relatively small areas whereby a strong signal and improved resolution may be obtained.

transducer 82 are coupled to the pulse-generator 26 and pulse-receiver 52 by means of a suitable coaxial transmission line 84.

In order to insure an effective coupling between the transducer 82 and the workpiece 72, it is desirable to employ a liquid couplant such as water, oil, etc. In the event the workpiece 72 is not normally immersed in such a liquid, the probe 70 and workpiece 72 may be embodied in a water-tight housing 86 which is filled with the coupling fluid 88. Suitable seals 90 may be provided at the opposite ends of this container 86 to permit the pipe or tube 72 to move therethrough. Drive rollers 92 may be disposed on the opposite sides of the housing 86 to transport the workpiece 72 axially through the housing 86 and the search unit during a test. During this movement, the pulse-generator 26 will periodically excite the transducer 82 into transmitting ultrasonic energy into the workpiece 72 and the pulse-receiver and amplifier 56 will listen between pulses for the reflection of energy produced by acoustical discontinuities within the workpiece 72.

In order to employ this embodiment, the workpiece 72 is inserted through the opposite ends of the housing 86 and the search unit 70 therebetween. The workpiece 72 is then advanced axially while pulses of ultrasonic energy are coupled from the transducer 82 and into the workpiece 72 over a 360° arc. As the workpiece 72 advances the ultrasonic energy will normally be dissipated within the walls 94. However, if there is a discontinuity, a portion of the energy will be reflected and received by the transducer 82, whereby the discontinuity will be detected.

It may thus be seen, an ultrasonic tester has been provided that is particularly adapted to inspect the entire volume of a workpiece at a high rate of speed while rotating the workpiece and/or the search. While only a limited number of embodiments are disclosed herein it will be readily apparent to persons skilled in the art that numerous changes and modifications may be made thereto, without departing from the spirit of the invention. Accordingly, the foregoing disclosure and description thereof, are for illustrative purposes only and do not limit the scope of the invention which is defined only by the claims which follow.

I claim:
1. An ultrasonic search unit for inspecting an elongated workpiece having a cylindrical outer surface, said search unit including the combination of
  a cylindrical backing member having a material which absorbs ultrasonic energy, said backing member having a first conical surface, a second conical surface and a cylindrical surface,
  an ultrasonic transducer having an outer conical surface and an inner conical surface, said outer surface being bonded to the first conical surface on the backing member, said inner surface being effective to transmit and receive ultrasonic energy, and
  a passage extending axially through said backing member and said transducer, said passage being sufficiently large to allow said workpiece to travel therethrough whereby the inner surface may be acoustically coupled to the cylindrical surface on the workpiece,
  all of the surfaces on said backing member being oblique to each other whereby the second conical surface and the cylindrical surfaces form a tapering section which terminates in an apex remote from the transducer, any ultrasonic energy coupled from the outer surface of the transducer into said backing member will be reflected away from the first surface and toward the apex so as to be absorbed in said backing member.

2. An ultrasonic search unit for inspecting an elongated workpiece having a cylindrical passage extending therethrough, said search unit including the combination of
  a cylindrical backing member of a material which absorbs ultrasonic energy, a first conical surface, a second conical surface and a cylindrical surface, said dampening member being effective to be inserted into said passage, and
  a conical ultrasonic transducer having an inner conical surface and an outer conical surface, said inner surface being bonded to the first conical surface on the backing member, said outer surface being effective to transmit and receive ultrasonic energy whereby the transducer may be acoustically coupled to the cylindrical surface on the workpiece,
  the cylindrical surface and the second conical surface being oblique to each other so as to form an apex remote from the transducer whereby any ultrasonic energy coupled from the transducer into said backing member is reflected away from the first surface and toward said apex so as to be absorbed within the backing member.

References Cited
UNITED STATES PATENTS

| | | | |
|---|---|---|---|
| 2,984,756 | 5/1961 | Bradfield. | |
| 3,111,027 | 11/1963 | Moffatt et al. | 73—67.8 |
| 3,121,324 | 2/1964 | Cowan | 73—67.5 |
| 3,228,233 | 1/1966 | Keldenich | 73—67.8 |

FOREIGN PATENTS

| | | |
|---|---|---|
| 142,467 | 1961 | U.S.S.R. |
| 148,573 | 1962 | U.S.S.R. |
| 1,400,484 | 4/1965 | France. |

RICHARD C. QUEISSER, *Primary Examiner.*

J. P. BEAUCHAMP, *Assistant Examiner.*